United States Patent [19]

Portnoy et al.

[11] 4,073,660

[45] Feb. 14, 1978

[54] RECOVERY OF CHEMICAL COMPONENTS OF CELLULOSIC REGENERATING SOLUTION

[75] Inventors: Norman A. Portnoy, Hopatcong, N.J.; David Paul Anderson, Amherst, Mass.

[73] Assignee: International Telephone and Telegraph Corporation, New York, N.Y.

[21] Appl. No.: 715,223

[22] Filed: Aug. 18, 1976

[51] Int. Cl.² .......................... C08K 5/20; C08B 3/32
[52] U.S. Cl. .................................. 106/311; 106/165; 106/168; 106/169; 201/2.5; 203/33; 203/36; 203/37; 203/28; 260/561 R; 423/400; 536/38; 536/30; 203/31
[58] Field of Search ........................ 203/33, 31, 36, 37, 203/28, 29; 201/2.5, 25; 162/29; 106/311, 165, 168, 169; 536/30, 32, 35, 38; 260/561 R; 423/400; 252/364

[56] References Cited

U.S. PATENT DOCUMENTS

| 1,845,665 | 2/1932 | Isham ................................ 260/643 R |
| 2,233,959 | 4/1941 | Plansoen .............................. 106/311 |
| 2,310,862 | 2/1943 | Nessler ................................... 536/38 |
| 3,063,804 | 11/1962 | Grossman ............................ 423/400 |
| 3,070,425 | 12/1962 | Morrow ............................... 423/400 |
| 3,236,064 | 2/1966 | Williams ........................... 106/311 R |
| 3,294,651 | 12/1966 | Pasin ..................................... 260/561 |
| 3,557,207 | 1/1971 | Hammond ........................... 260/561 |
| 3,702,843 | 11/1972 | Schweiger ............................. 536/35 |
| 3,929,586 | 12/1975 | Slikkers ................................. 203/37 |
| 3,959,371 | 5/1976 | Gavlin et al. .......................... 203/37 |

OTHER PUBLICATIONS

Venkateswaren et al., Journal of Applied Polymer Science, vol. 18, 1974, pp. 133–142.

*Primary Examiner*—Wilbur L. Bascomb, Jr.
*Attorney, Agent, or Firm*—J. B. Raden; H. J. Holt

[57] ABSTRACT

Recovery of the chemical components of a cellulosic organic solvent regenerating solution containing a dialkylacylamide, water, nitrous and nitric acid. The process comprises neutralizing the solution to form the metal salts of nitrous and nitric acid, distilling the neutralized solution to remove and recover the water and dialkylacylamide solvent and pyrolyzing the metal salts in the presence of oxygen to remove and recover nitrogen dioxide gas. The process results in substantially total recovery of the process chemicals.

16 Claims, 1 Drawing Figure

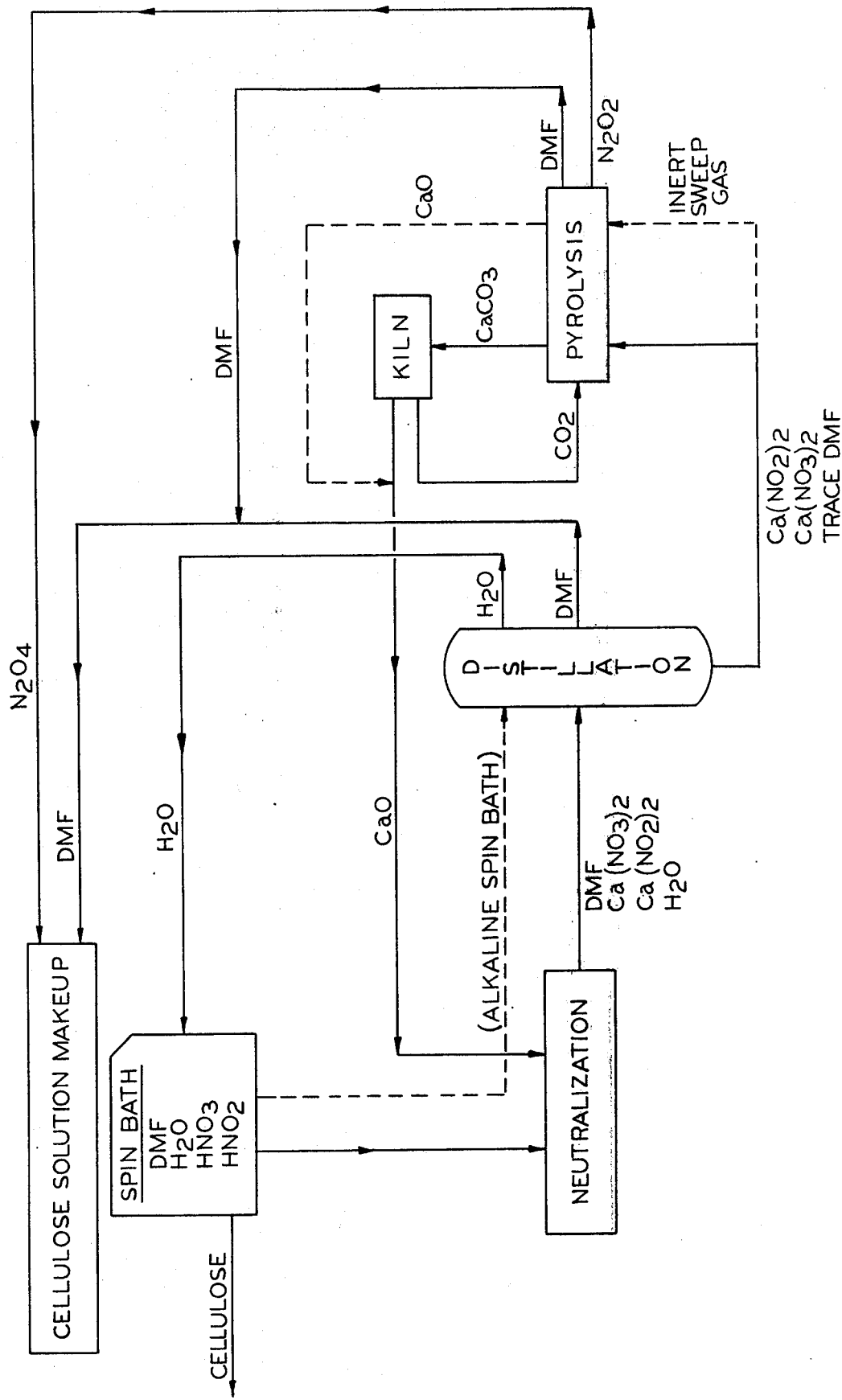

RECOVERY OF CHEMICAL COMPONENTS OF CELLULOSIC REGENERATING SOLUTION

This invention relates to a process for the separation and recovery of the chemical components of an organic solvent solution used for the preparation of regenerated cellulosic articles.

The use of organic solvent systems for dissolving cellulose and producing regenerated cellulosic products is receiving an increased amount of attention because of the cost and environmental problems associated with conventional viscose processes. One such organic solvent system consists of a dialkylacylamide solvent and dinitrogen tetroxide as a nitrosating agent. In such a system, the cellulose is regenerated from the organic solvent by contact with a nonsolvent for the cellulose which may be water or a lower alcohol. A complete description of one such organic solvent system and the regeneration of cellulose therefrom is contained in co-pending application Ser. No. 662,137, filed Feb. 27, 1976 and assigned to the present assignee. Reference should be made to the foregoing application for a more complete disclosure of such a process. Insofar as is known, there is no disclosure in the literature of a recovery system for such an organic solvent process.

Our co-pending application Ser. No. (N. A. Portnoy-D. P. Anderson 6-1), filed on even date herewith, is directed to a recovery system for such organic solvent systems in which the cellulose is regenerated by contact with a lower alcohol.

It is a primary object of this invention to provide a simple and effective process for the recovery and recycle of the components of organic solvent regenerating systems which process involves essentially no release of chemicals to the air or stream.

It is a more specific object of the invention to provide a recovery process for such an organic solvent system in which water is the regenerant.

The regenerating solutions with which the present recovery system is useful contain a dialkylacylamide solvent, a regenerant such as water, nitrous and nitric acid. The recovery process involves the steps of neutralizing the solution to form the metal salts of nitrous and nitric acid, distilling the neutralized solution to remove and recover the dialkylacylamide solvent, pyrolyzing the nitrite and nitrate metal salts to remove and recover the nitrogen dioxide (or its dimer, dinitrogen tetroxide — $N_2O_4$). The solvent and nitrogen dioxide may be recycled and reused for cellulose regeneration.

In the aforesaid co-pending application Ser. No. 662,137 disclosing the regeneration of cellulose from organic solvent systems, there is also disclosed the use of a reactive base, such as sodium or potassium hydroxide, in the regenerating solution to bring about more controlled regeneration of the cellulose. The amount of such base, from 6 to 25%, is equivalent to a concentration of alkali significantly in excess of the amount required to neutralize the nitric and nitrous acid in the regenerating solution. If a base is present in the regenerating solution, as set forth in the above identified application, then the regenerating solution already contains the metal salts of nitrous and nitric acid. The initial neutralization step of the invention may therefore be omitted and the regenerating solution may be directly advanced to the distillation step. The remainder of the process would remain as set out above.

The invention will be better understood by reference to the attached drawing in which the single figure is a schematic flow diagram of one embodiment of the process of the invention.

A typical organic solvent solution of the type to which the present invention is directed contains a dialkylacylamide solvent such as dimethylformamide, the dissolved and nitrosated cellulose in the form of a cellulose nitrite ester and nitric acid. The flow diagram illustrates the spinning of fibers from this solution into a spin bath containing a water coagulant or regenerant. After contact with the spin bath, the cellulosic fibers, films or other shaped articles which are regenerated are separated and further processed as required. As shown in the flow diagram, the spin bath now contains the nitric acid carried into the regenerating solution from the solvent solution, the dialkylacylamide solvent, here illustrated as dimethylformamide (DMF), water, nitrous acid formed from reaction of the nitrosating agent with water and from aqueous regeneration of the cellulose nitrite. The concentration of nitric acid in the regenerating solution is a function of the concentration of the remaining components -- dialkylacylamide, nitrous acid and water. Although the process is effective with virtually any concentrations of the foregoing components, the concentration of nitric acid in such solutions will as a practical matter almost always vary from 1 to 12%, by weight.

If the spin bath does not contain a base, the initial step of the recovery process involves neutralization of the spin bath. The neutralization is preferably carried out with calcium oxide or calcium hydroxide (lime). However, neutralization may also be carried out with a broad variety of basic reagents including metal hydroxides, oxides and carbonates, as for example, oxides, hydroxides and carbonates of other alkali and alkaline earth metals such as sodium and potassium. Virtually any metallic base that will neutralize $HNO_3$ and $HNO_2$, produce the metal nitrite and nitrate and decompose to $N_2O_4$ may be used including the oxides, hydroxides and carbonates of Pb, Mn, Zn, Ag, Ti, V, Sr, Bi, Be, Co, Al, Cu, Cd, Fe, Cr, and Ni.

Where CaO has been used as the neutralizing agent, the neutralized mixture contains $Ca(NO_2)_2$ and $Ca(NO_3)_2$ which are for the most part soluble in DMF, in addition to DMF and water. The DMF and water may be readily separated by a fractional distillation step in which the DMF is recycled to the cellulose makeup solution. If the spin bath is an alkaline spin bath, the initial step of the recovery process, shown by dotted lines in the flow diagram, is the fractional distillation step in which the DMF and water are separated and recycled to the cellulose makeup solution. In either case, that is whether or not an initial neutralization step is used, the remaining metal nitrite and nitrate salts and the $N_2O_4$ are recovered and reclaimed by pyrolysis.

The pyrolysis reaction is carried out at a temperature above 600° C., preferably above 800° C. in the presence of oxygen for times varying from one to three hours, the times varying inversely with the temperature. The presence of oxygen is necessary to convert the nitric oxide (NO), formed by pyrolysis of the nitrite, to nitrogen dioxide ($NO_2$), or its dimer, nitrogen tetroxide ($N_2O_4$). The oxidation stage may be conveniently carried out by passing oxygen into the gases evolving from the pyrolysis reaction, although since the pyrolysis of the nitrate salt supplies the required oxygen, the elements of $N_2O_4$ would be present in the evolution gas stream provided that both nitrate and nitrite salts pyrolyze at the same rates. A sweep gas is used to provide the required atmosphere for the pyrolysis and to move the gases through the various pyrolysis stages. If the sweep gas is an inert gas as shown by dotted lines in the flow diagram, such as nitrogen, the metal oxide or hydroxide of the metal salt will be formed which may then be recycled to the neutralization step for neutralizing the spin bath. If the sweep gas is a reactive gas such as carbon monoxide or carbon dioxide, the metal carbonate will form which must be heated usually above 825° C. by well known techniques to above its dissociation temperature to form the corresponding metal oxide and carbon dioxide. The dissociation temperature of calcium carbonate, at which the partial pressure of $CO_2$ reaches one atmosphere, is 910° C. However, the dissociation reactions are usually conducted at kiln temperatures of from 1100°–1300° C. The carbon dioxide formed by the dissociation reaction may be reused as a sweep gas in subsequent pyrolysis reactions and the metal oxide (or hydroxide) reused for neutralization.

The general principles embodied in these pyrolysis reactions apply to calcium nitrite and calcium nitrate and carbon dioxide sweep gases as well as other metal salts and sweep gases. However, the pyrolysis reactions may be illustrated in the following equations in which the metal salt is a calcium salt and the sweep gas is $CO_2$:

1. $Ca(NO_3)_2 + CO_2 \rightleftharpoons CaCO_3 + 2NO_2 + \frac{1}{2} O_2$
2. $Ca(NO_2)_2 + CO_2 \rightleftharpoons CaCO_3 + NO_2 + NO$
3. $NO_2 + NO + \frac{1}{2} O_2 \rightleftharpoons N_2O_4$ Illustrative inert sweep gases which may be used are nitrogen, helium, argon and air. Illustrative reactive gases are carbon monoxide and carbon dioxide. Best results are, however, achieved with $CO_2$ although the resulting salt, $CaCO_3$ where lime is used as the neutralizing agent, is not as good as CaO for recycling for use in the neutralization step. The $CaCO_3$ must, as above indicated, be heated in a kiln to convert to CaO and $CO_2$, the $CO_2$ then being used as a sweep gas in subsequent pyrolysis cycles. If an inert gas such as air or $N_2$ is used in the pyrolysis, then CaO is formed directly. The yields of $N_2O_4$ range from 79 to 93% at pyrolysis temperatures of 800° C., the specific yield depending on the sweep gas used.

Where the spin bath is neutralized with, or already contains sodium or potassium hydroxide, rather than lime as the base, the corresponding sodium or potassium nitrate and nitrite salts may be pyrolyzed in substantially the same fashion set out above, although pyrolysis temperatures are preferably at least 100° C. and yields are not quite as high as with the calcium salts. Sodium salt pyrolysis is slightly more efficient than potassium salt pyrolysis.

The following examples illustrate the practice of the invention. All parts are by weight unless otherwise indicated.

EXAMPLE 1

A spin bath is prepared by contacting 450.0 g. of and 8/15/77 cellulose solution (parts by weight of cellulose/$N_2O_4$/DMF) with 95.2 g. of water. The solid regenerated cellulose is separated and the spin bath is neutralized with 42 g. of CaO. The neutralized mixture is distilled at reduced pressure to give water, DMF and a bottom fraction of $Ca(NO_2)_2$ and $Ca(NO_3)_2$. This solid residue is pyrolized in a $CO_2$ atmosphere at 800° C. for 90 minutes at a $CO_2$ sweep gas rate of 100 ml/min. of $CO_2$ and the product nitrogen oxides are swept through a chamber and mixed with $O_2$ at a rate of 50 ml/min. of $O_2$. The solid $CaCO_3$ residue from the pyrolysis is heated to about 1200° C. to form CaO and $CO_2$. The CaO is used for neutralization of subsequent spin baths and the $CO_2$ is used as a pyrolysis sweep gas in subsequent pyrolysis cycles. The recoveries of water and DMF are 99 and 97% respectively and the yield of $N_2O_4$ is 93%.

EXAMPLE 2

An 8/15/77 cellulose solution (cellulose/$N_2O_4$/DMF) in an amount of 451.3 g. is regenerated by contact with 110.2 g. of water containing 60 g. of NaOH. The solid regenerated cellulose is separated and the regeneration solution is distilled at reduced pressure to give water, DMF and a bottom fraction of $NaNO_3$ and $NaNO_2$. The solid residue is pyrolyzed in a $CO_2$ atmosphere at 1000° C. for 90 minutes with a sweep rate of 100 ml/min of $CO_2$. The product nitrogen oxides are swept through a chamber and mixed with $O_2$ gas at a flow rate of 50 ml/min. of $O_2$. The solid residue from the pyrolysis, which is mostly unpyrolyzed $NaNO_3$, $NaNO_2$ and $Na_2CO_3$ is used for regeneration solution makeup. The $Na_2CO_3$ is converted to $Na_2O$ by heating to 1200° C. and the $CO_2$ evolving during this conversion is used as a sweep gas in subsequent pyrolysis cycles. The recoveries of water and DMF are 99 and 97% respectively and the recovery of $N_2O_4$ is 77%.

EXAMPLE 3

Two and four hundredths parts of an equimolar $Ca(NO_3)_2$: $Ca(NO_2)_2$ mixture which had been prepared from predried salts was heated in a pyrolysis chamber at 800° C for 90 minutes while the chamber was being swept with $CO_2$ at a rate which displaced the chamber volume every 30 seconds. The effluent gases were continuously swept through an oxidizing chamber which was swept with $O_2$ for 20 minutes and air for the remaining 70 minutes both at a rate equal to the rate of the gas which was sweeping the pyrolysis chamber. This produced 1.07 parts of $N_2O_4$, 84.4% yield.

EXAMPLE 4

The procedure in Example 3 was followed except that 2.00 parts of the mixed salt was used. This was pyrolyzed for 120 minutes at 600° C. This produced 0.760 parts $N_2O_4$ 61.1% yield.

EXAMPLE 5

The procedure of Example 3 was followed except that 2.00 parts of the mixed salt was used and the rate of the oxidization gas sweeping the oxidation chamber was one half of the rate of the gas sweeping the pyrolysis chamber. This produced 1.19 parts $N_2O_4$, 95.7% yield.

EXAMPLE 6

The procedure of Example 3 was followed except that 2.02 parts of the mixed salt was used and the $CO_2$ sweeping the pyrolysis chamber displaced the volume of the chamber once every minute. The rate of the oxidation gas sweeping the oxidation chamber was twice the rate of the gas sweeping the pyrolysis chamber. This produced 1.15 parts, 92% yield.

EXAMPLE 7

The procedure of Example 3 was followed except that 2.17 parts of the mixed salt was pyrolyzed while sweeping the pyrolysis chamber with $N_2$. This produced 1.09 parts $N_2O_4$, 81% yield.

EXAMPLE 8

The procedure of Example 5 was carried out except that the pyrolysis chamber was swept with air. This produced 1.14 parts $N_2O_4$, 91.4% yield.

EXAMPLE 9

The procedure of Example 3 was carried out except that 2.01 parts of an equimolar mixture of $KNO_3$, and $KNO_2$ which had been prepared from predried salts was heated in a pyrolysis chamber at 1000° C. for 90 minutes. This produced 0.617 parts of $N_2O_4$, 61.9% yield.

EXAMPLE 10

The procedure of Example 3 was carried out except that 2.0 parts of an equimolar mixture of $NaNO_3$ and $NaNO_2$ which had been prepared from predried salts was heated in a pyrolysis chamber at 1000° C. for 90 minutes. This produced 0.918 parts of $N_2O_4$, 76.8% yield.

We claim:

1. A process for the recovery of the chemical components of a cellulosic regenerating solution containing a dialkylacylamide solvent, a regenerant and the metal salts of nitrous and nitric acid comprising distilling the solution to remove and recover the dialkylacylamide solvent, and pyrolyzing the metal salts at a temperature of at least 600° C. in the presence of oxygen while passing a sweep gas over said salts to remove and recover nitrogen dioxide gas evolving from said pyrolysis reaction.

2. The process of claim 1 in which the metal salts are the calcium salts of nitrous and nitric acid.

3. The process of claim 1 in which the solvent is dimethylformamide.

4. The process of claim 1 in which the dialkylacylamide solvent and nitrogen dioxide gas are recycled for makeup of the cellulose solution.

5. The process of claim 1 in which the sweep gas used in the pyrolysis reaction in an inert gas and a metal oxide or hydroxide of said metal salt is formed and recovered for reuse in said recovery process.

6. The process of claim 1 in which the sweep gas used in the pyrolysis reaction is carbon dioxide and a metal carbonate of said metal salt is formed and recovered for reuse in said recovery process.

7. The process of claim 6 in which the metal carbonate is heated to its temperature of dissociation to form carbon dioxide and the corresponding metal oxide, the carbon dioxide being recycled as a sweep gas to the pyrolysis reaction.

8. The process of claim 1 in which pyrolysis is at a temperature of at least 800° C.

9. A process for the recovery of the chemical components of a cellulosic regenerating solution containing a dialkylacylamide solvent, water, nitrous acid and nitric acid comprising neutralizing the solution to form the metal salts of nitrous and nitric acid, distilling the neutralized solution to remove and recover the water and dialkylacylamide solvent, and pyrolyzing the metal salts at a temperature of at least 600° C. in the presence of oxygen while passing a sweep gas over said salts to remove and recover nitrogen dioxide gas evolving from said pyrolysis reaction.

10. The process of claim 9 in which the metal salts are the calcium salts of nitrous and nitric acid.

11. The process of claim 9 in which the solvent is dimethylformamide.

12. The process of claim 9 in which the dialkylacylamide solvent and nitrogen dioxide gas are recycled for makeup of the cellulosic solution.

13. The process of claim 9 in which pyrolysis is at a temperature of at least 800° C.

14. The process of claim 9 in which the sweep gas used in the pyrolysis reaction is an inert gas and a metal oxide or hydroxide of said metal salt is formed and recycled to said neutralization step.

15. The process of claim 9 in which the sweep gas used in the pyrolysis reaction is carbon dioxide and a metal carbonate of said metal salt is formed.

16. The process of claim 15 in which the metal carbonate is heated to its dissociation temperature to form carbon dioxide and the corresponding metal oxide, the carbon dioxide being recycled as a sweep gas to the pyrolysis reaction and the metal oxide being recycled for neutralization of said cellulosic solution.

* * * * *